(12) United States Patent
Guild et al.

(10) Patent No.: US 11,847,665 B2
(45) Date of Patent: Dec. 19, 2023

(54) SYSTEMS AND METHODS FOR GENERATING MARKETING INCENTIVES

(71) Applicant: Capital One Services, LLC, McLean, VA (US)

(72) Inventors: Benjamin Guild, Walnut, CA (US); Alan Rozet, New York, NY (US)

(73) Assignee: Capital One Services, LLC, McLean, VA (US)

( * ) Notice: Subject to any disclaimer, the term of this patent is extended or adjusted under 35 U.S.C. 154(b) by 550 days.

(21) Appl. No.: 16/878,431

(22) Filed: May 19, 2020

(65) Prior Publication Data

US 2021/0365973 A1 Nov. 25, 2021

(51) Int. Cl.
*G06Q 30/0211* (2023.01)
*G06N 20/20* (2019.01)
(Continued)

(52) U.S. Cl.
CPC ....... *G06Q 30/0211* (2013.01); *G06F 18/214* (2023.01); *G06N 20/20* (2019.01); *G06Q 30/0235* (2013.01)

(58) Field of Classification Search
USPC ...................................................... 705/14.13
See application file for complete search history.

(56) References Cited

U.S. PATENT DOCUMENTS 10,032,180 B1 * 7/2018 Shariff .................. G06Q 30/02
10,192,243 B1 * 1/2019 Genc-Kaya ........ G06Q 30/0247
(Continued)

OTHER PUBLICATIONS

Magni, Carlo Alberto, Reasoning the 'Net-Present-Value' Way: Some Biases and How to Use Psychology for Falsifying Decision Models (2005). (Year: 2005).*

*Primary Examiner* — Christopher B Tokarczyk
(74) *Attorney, Agent, or Firm* — Bookoff McAndrews, PLLC (57) ABSTRACT

A computer-implemented method of generating a marketing offer for a user associated with a mobile device may include: receiving first data that includes offers for sale of a product; generating and transmitting a stream of the offers to the mobile device; adding a respective incentive to a corresponding offer in the stream, wherein: a magnitude of the respective incentive is incremented toward a corresponding maximum based on a quantity of users that have redeemed the corresponding offer; and the maximum for the respective incentive is determined based on a first machine learning model configured to optimize a net present value of offers, the first machine learning model being trained using historical data of engagement rates of users for offers with a variety of incentives; receiving historical user information associated with the user; and using a second machine learning model, selecting a particular offer from the stream and transmitting a notification to the mobile device, separate from the stream, that includes the particular offer, the second machine learning model configured to optimize the selection of the particular offer for one or more of a maximum value of the particular offer to the user or a likelihood of engagement of the user with the particular offer, and the second machine learning model being trained using the second data, the first data, and one or more incentives added to offers in the first data.

18 Claims, 3 Drawing Sheets

(51) Int. Cl.
    *G06Q 30/0235*    (2023.01)
    *G06F 18/214*    (2023.01)

(56) References Cited

U.S. PATENT DOCUMENTS

| | | | |
|---|---|---|---|
| 2002/0123930 A1* | 9/2002 | Boyd | G06Q 30/0254 |
| | | | 705/14.1 |
| 2008/0082420 A1 | 4/2008 | Kargman et al. | |
| 2012/0101887 A1* | 4/2012 | Harvey | G06Q 20/385 |
| | | | 705/26.1 |
| 2012/0296730 A1 | 11/2012 | Xavier | |
| 2013/0268328 A1* | 10/2013 | Kurapati | G06Q 30/0207 |
| | | | 705/14.1 |
| 2015/0025991 A1 | 1/2015 | Shaw | |

\* cited by examiner

SYSTEMS AND METHODS FOR GENERATING MARKETING INCENTIVES

TECHNICAL FIELD

Various embodiments of the present disclosure relate generally to methods and systems for generating marketing incentives, and relate particularly to dynamic marketing incentives associated with social engagement.

BACKGROUND

Vendors commonly provide marketing incentives in order to drive customers to their respective businesses. A marketing incentive, such as a discount, cash back, membership points, a reward, etc., may cause a customer to prioritize an associated offer from a particular vendor over other offers from other vendors. However, when multiple vendors are providing marketing incentives for competing offers, it may be difficult for any one vendor to differentiate their particular offer from the others to customers. Moreover, it may be difficult for a customer to determine which offers and/or marketing incentives provide the best value to the customer.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure methods, systems, and non-transitory computer-readable media are disclosed for generating and/or providing offers and/or incentives to a user. Each of the examples disclosed herein may include one or more of the features described in connection with any of the other disclosed examples.

In one example, an exemplary embodiment of a computer-implemented method of generating a marketing offer for a user associated with a mobile device may include: receiving first data that includes one or more offers for sale of a product; generating a stream of offers based on the first data, and transmitting the stream of offers to the mobile device; and adding a respective incentive to a corresponding offer in the stream, wherein: a magnitude of the respective incentive is incremented toward a corresponding maximum based on a quantity of users that have redeemed the corresponding offer; and the maximum for the respective incentive is determined based on a first machine learning model configured to optimize a net present value of offers to corresponding vendors of the offers, the first machine learning model being trained using historical data of engagement rates of users for offers with a variety of incentives. Additionally, the method may include: receiving second data that includes historical user information associated with the user; and using a second machine learning model, selecting a particular offer from the stream and transmitting a notification to the mobile device, separate from the stream, that includes the particular offer, the second machine learning model configured to optimize the selection of the particular offer for one or more of a maximum value of the particular offer to the user or a likelihood of engagement of the user with the particular offer, and the second machine learning model being trained using the second data, the first data, and one or more incentives added to offers in the first data.

In another example, another exemplary embodiment of a computer-implemented method of generating a marketing offer for a user associated with a mobile device may include: receiving first data that includes one or more offers for sale of a product; generating a stream of offers based on the first data, and transmitting the stream of offers to the mobile device; adding a respective incentive to a corresponding offer in the stream, wherein: the respective incentive includes one or more of a discount, a point reward, a cash-back percentage, a fixed-amount cash back, a coupon, a bonus product, or a bonus offer; a magnitude of the respective incentive is incremented toward a corresponding maximum based on a quantity of users that have redeemed the corresponding offer; and the maximum for the incentive is determined based on a first machine learning model configured to optimize a net present value of offers to corresponding vendors of the offers, the first machine learning model being trained using historical data of engagement rates of users for offers with a variety of incentives. Further the method may include: receiving second data that includes historical user information associated with the user; using a second machine learning model, selecting a particular offer from the stream and transmitting a notification to the mobile device, separate from the stream, that includes the particular offer, the second machine learning model configured to optimize the selection of the particular offer for one or more of a maximum value of the particular offer to the user or a likelihood of engagement of the user with the particular offer, and the second machine learning model being trained using the second data, the first data, and one or more incentives added to offers in the first data; determining that the user is a mutual contact on at least one electronic network of one or more users; and in response to receiving an indication that the one or more users has redeemed an offer in the stream, incrementing the magnitude of the respective incentive for the user and the one or more users toward the corresponding maximum based on a quantity of users that have redeemed the offer.

In a further example, another exemplary embodiment of a computer-implemented method of generating a marketing offer for a user associated with a mobile device may include: receiving first data that includes one or more offers for sale of a product; generating a stream of offers based on the first data, and transmitting the stream of offers to the mobile device; adding a respective incentive to a corresponding offer in the stream, wherein: a magnitude of the respective incentive is incremented toward a corresponding maximum based on a quantity of users that have redeemed the corresponding offer; and the maximum for the incentive is determined based on a first machine learning model configured to optimize a net present value of offers to corresponding vendors of the offers, the first machine learning model being trained using historical data of engagement rates of users for offers with a variety of incentives. Also, the method may include: receiving second data that includes historical user information associated with the user; and using a second machine learning model, selecting a particular offer from the stream and transmitting a notification to the mobile device, separate from the stream, that includes the particular offer, the second machine learning model configured to optimize the selection of the particular offer for one or more of a maximum value of the particular offer to the user or a likelihood of engagement of the user with the particular offer, and the second machine learning model being trained using the second data, the first data, and one or more incentives added to offers in the first data; in response to receiving an indication that one or more users has redeemed an offer in the stream, incrementing the magnitude of the respective incentive toward the corresponding maximum based on a quantity of users that have redeemed the offer; and in response to receiving indication from the mobile device that the user has redeemed an offer from the stream, transmitting an identification of the redemption of the offer to at least one additional user.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

In this disclosure, the term "computer system" generally encompasses any device or combination of devices, each device having at least one processor that executes instructions from a memory medium. Additionally, a computer system may be included as a part of another computer system. As used herein, the term "dealer" may indicate, and may be used interchangeably with, a seller of items or services, a vendor of items or services, etc. The term "client" may indicate, and may be used interchangeably with, a customer, buyer, person attempting to obtain a lease, ownership, ownership share, etc., of an item and/or service. The term "product" as used herein may refer to goods, services, property, rights, other things of value that may be transferred, or combinations thereof. The term "offer" generally encompasses information indicating an availability of a product for sale and/or information enabling a customer to purchase said product. To "execute" an offer generally encompasses purchasing the product associated with the offer, redeeming the product or other benefit associated with the offer and/or fulfilling whatever terms or criteria are associated with the offer. To "execute" an incentive for an offer generally encompasses executing an offer along with and/or as modified by terms, provisions, and/or benefits associated with the incentive.

In general, the present disclosure provides methods and systems for generating and/or providing customers with marketing incentives, and relates particularly to dynamic marketing incentives associated with social engagement. As will be discussed below in more detail, in methods and systems according to the present disclosure, existing techniques may be improved.

Marketing incentives are a tool commonly used to drive business to a vendor. However, when multiple vendors are competing with each other, and the market is flooded with various offers and incentives, it may be difficult for a vendor to stand out to customers. Further, it may be difficult for customers to make buying choices that maximize the value of their purchases.

These issues may be compounded due to the substantial omnipresence of marketing and advertising available to the customer, e.g., due to the broad accessibility provided by mobile devices and other connected devices. Oversaturation may form a barrier to entry for customers considering a purchase. Moreover, when compared to a shopping experience using a traditional desktop computing device or visiting a physical store, conventional mobile shopping platforms generally provide more limited options and/or information. As a result, when using a mobile device to shop, a customer's interest in making a purchase may be chilled or postponed in favor of waiting until able to visit the physical store or use the desktop computing device.

Accordingly, a need exists to improve marketing incentives so that a vendor may stand out from competitors and engage with customers. A need also exists to improve the information about marketing incentives available to the customer. A need additionally exists to improve how offers and marketing incentives are provided via mobile devices without oversaturating, chilling, or confusing the customer.

In one aspect, this disclosure pertains to marketing incentives that are associated with social engagement of multiple users. In some embodiments, incentives are increased or "boosted" in response to being redeemed by multiple users. As a result, in some embodiments, an incentive may represent or form a micro-community that introduces a social aspect to making a purchasing decision. In one aspect of the disclosure, such incentives may also leverage existing social communities, e.g., by such an incentive being boosted when the existing social contacts of a user redeem an offer associated with the incentive. In this manner, not only may the user benefit from redeeming an incentive, but also their act of redemption may boost the incentive for other users.

This environment of mutual benefit may reduce the barrier to entry for making purchasing decisions.

In a further aspect of the disclosure, incentives with a time limit or limited time window of availability, in conjunction with the micro-community aspect discussed above, may result in or form a fear-of-missing-out in the user. For example, a user may observe a micro-community and/or members of their existing social group taking advantage of a group-benefit, and the desire to be included in such group may decrease the barrier of entry in making a purchase decision. Moreover, the time-windowed and community-driven aspect of such features may not only provide vendors with a targeted, traceable, and/or community-forming incentives, but also may drive business and/or provide value to the vendor.

Figure 1:
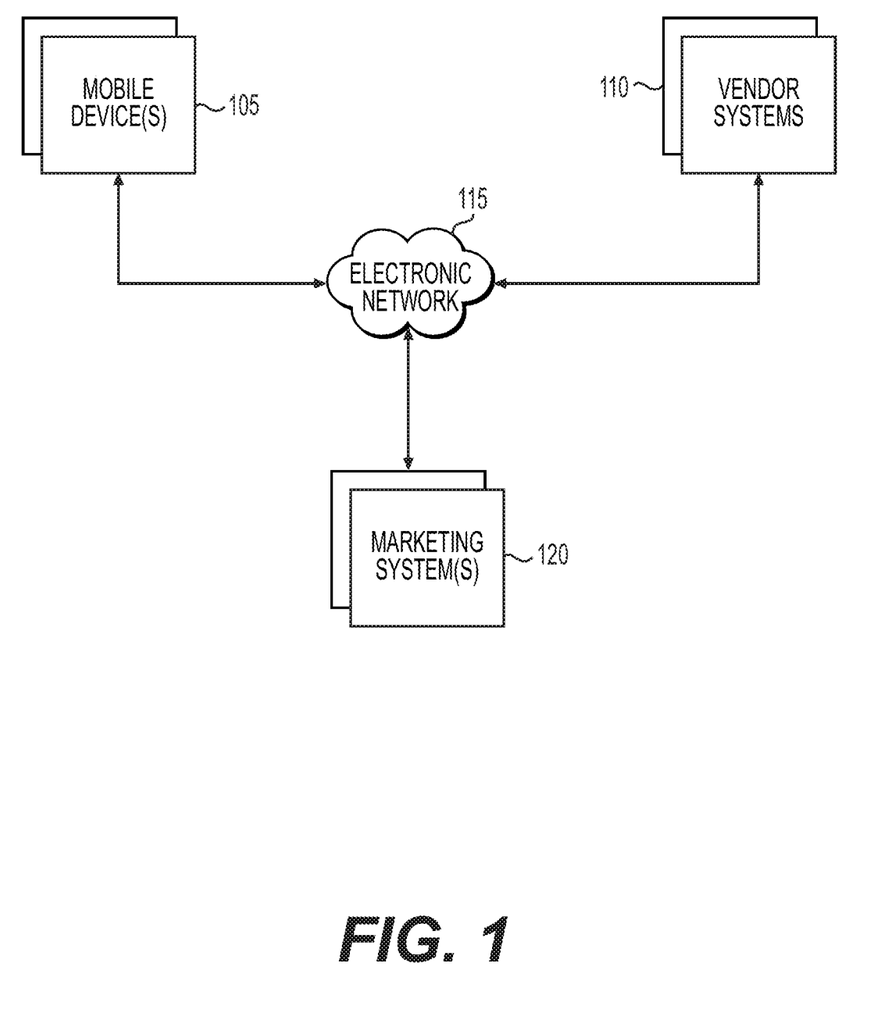
FIG. 1 depicts an exemplary client-server environment that may be utilized according to aspects of the present disclosure.

FIG. 1 depicts an exemplary client-server environment that may be utilized with techniques presented herein. One or more mobile device(s) 105 and/or one or more vendor system(s) 110 may communicate with each other and/or other systems across an electronic network 115. The systems of FIG. 1 may communicate in any arrangement. The mobile device 105 may be associated with a user or customer, e.g., a customer seeking to browse or purchase a product As will be discussed herein, one or more marketing system(s) 120 may communicate with the mobile device 105 and/or the vendor system 110 over the electronic network 115 in order to provide offers for products and/or incentives for offers. In various embodiments, the marketing system 120 may employ one or more machine learning models in order to assemble, rank, and/or provide offers for a particular customer, as well as generate, provide, and/or adjust incentives to offers. As used herein, a "machine learning model" may include data (e.g., product data, offer data, incentive data, vendor data, or historical customer data) or instruction(s) for generating, retrieving, and/or analyzing such data.

In various embodiments, the electronic network 115 may be a wide area network ("WAN"), a local area network ("LAN"), personal area network ("PAN"), or the like. In some embodiments, electronic network 115 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web").

While FIG. 1 depicts the various systems as physically separate and communicating across network 115, in various embodiments features of certain systems, such as the marketing system 120, may be incorporated partially or completely into any of the other systems of FIG. 1. For example, the marketing system 120 may include a marketing platform, an e-commerce application, and/or a website page that may be accessible via the electronic network 115 on the vendor system 110 and/or the mobile device 105. Some or all of the functionality of one or more machine learning models included in the marketing system 120 may be incorporated into the mobile device 105, the vendor system 110, or another system.

Figure 2:
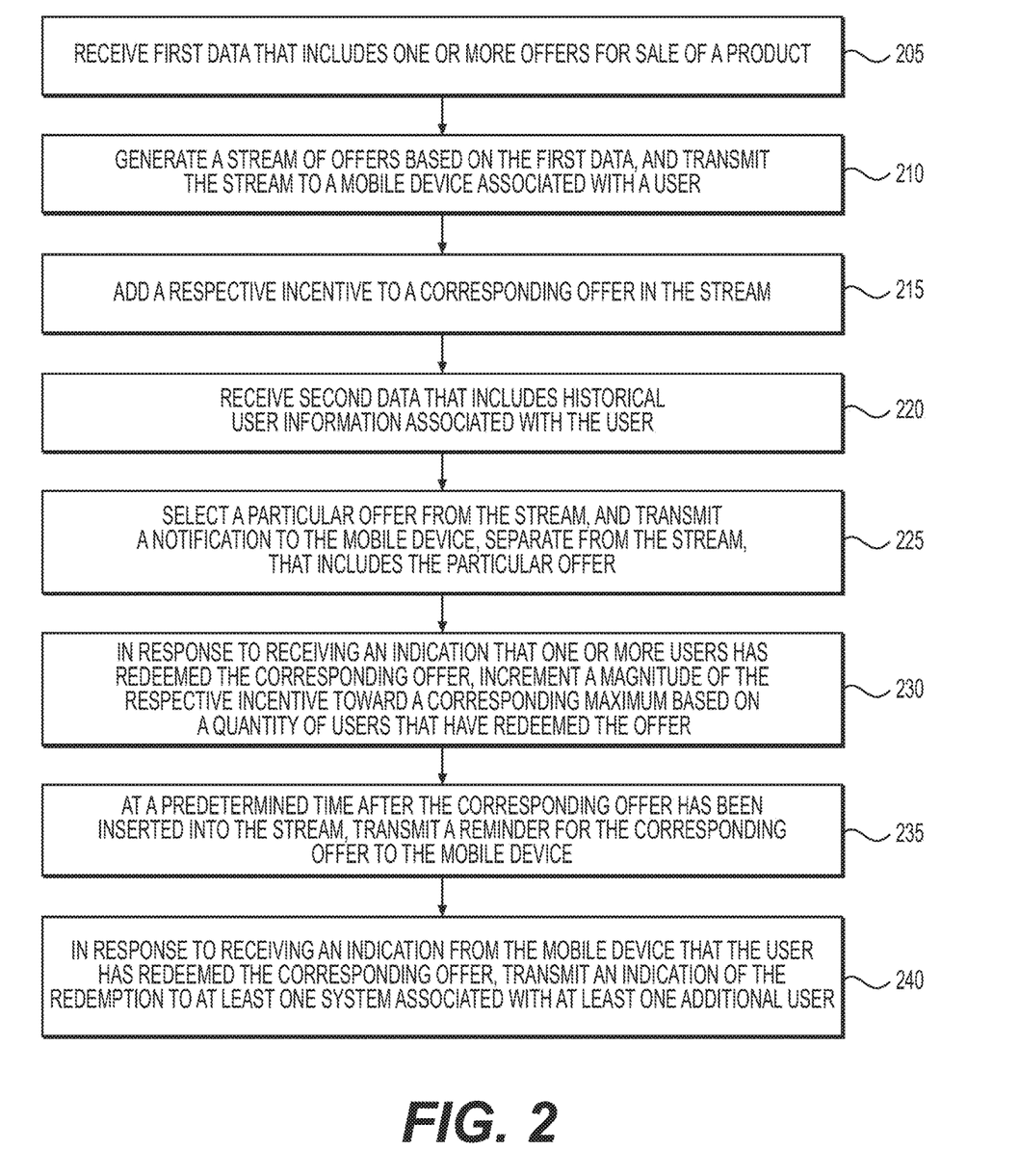
FIG. 2 depicts an exemplary process for generating and/or providing an offer and/or incentive to a user.

FIG. 2 illustrates an exemplary process for generating and/or providing a marketing offer for a user associated with the mobile device 105. At step 205, the marketing system 120 may receive first data that includes one or more offers for sale of a product. At step 210, the marketing system 120 may generate a stream of offers based on the first data, and may transmit the stream of offers to the mobile device 105. At step 215, the marketing system 120 may add a respective incentive to a corresponding offer in the stream. At step 220, the marketing system 120 may receive second data that includes historical user information associated with the user, e.g., at least one offer with which the user was engaged and/or has redeemed. At step 225, the marketing system 120 may select a particular offer from the stream, and may transmit a notification to the mobile device 105, separate from the stream, that includes the particular offer. At step 230, in response to receiving an indication that one or more users has redeemed the corresponding offer, the marketing system 120 may increment a magnitude of the respective incentive toward a corresponding maximum based on a quantity of users that have redeemed the corresponding offer. At step 235, at a predetermined time after the corresponding offer has been inserted into the stream, the marketing system 120 may transmit a reminder for the corresponding offer to the mobile device 105. At step 240, in response to receiving an indication from the mobile device 105 that the user has redeemed the corresponding offer, the marketing system 120 may transmit an indication of the redemption of the corresponding offer to at least one system associated with at least one additional user. Each of these steps is discussed in further detail below.

With regard to step 205, in some embodiments, a respective offer in the first data may include one or more of information associated with the offer, information associated with a product offered for sale, a price for the product, information associated with the vendor system 110 associated with the offer, an incentive for the offer provided by the associated vendor, or affiliate information associated with the offer and/or the vendor system 110. Offer information may include, for example, a time window of availability for the offer, information usable to execute the offer such as, for example, a Universal Resource Locator ("URL") associated with a website page of an e-commerce platform associated with the offer or data usable by an e-commerce application to execute the offer, information associated with a quantity and/or identity of users that have previously engaged with or executed the offer, or the like. Product information may include, for example, a product name, a description, product dimensions or parameters, availability information, shipping information, or the like. The price for the product may include a purchase price as well as shipping cost information, tax information, or the like. Vendor information may include, for example, a vendor name, a vendor description, etc. Incentives that may be offered by the vendor system 110 may include, for example, membership points, cash back, or the like. Affiliate information may include, for example, an affiliate commission or commission rate available to the marketing system 120 upon an offer being fulfilled by a customer via the marketing system 120.

The first data may be received from any acceptable source or any number of acceptable sources. In some embodiments, at least a portion of the first data may be based on data associated with the vendor system 110. In some embodiments, at least a portion of the first data may be retrieved from a database associated with the marketing system 120. In some embodiments, the marketing system 120 may transmit a request for available offers to the vendor system 110, and may receive at least a portion of the first data as a reply. In some embodiments, the vendor system 110 may transmit a request including one or more offers to be made available to customers via the marketing system 120. In some embodiments, the marketing system 120 may access product data and/or offer data on a vendor system 110, e.g., via a website page or database associated with the vendor system 110, and may generate one or more offers based on such data.

In some embodiments, the marketing system 120 may employ another system and/or an automated algorithm to find and retrieve offers, e.g., from the Internet, an e-commerce platform, or the like. In some embodiments, the first data may include one or more offers that were manually entered by a user of the marketing system 120 or another system. Any acceptable source for the first data may be used. In various embodiments, the marketing system 120 may perform step 205 periodically, continuously, or in response to a request from another system such as the mobile device 105 and/or the vendor system 110.

With regard to step 210, as used herein, the "stream" of offers generated by the marketing system 120 generally encompasses a series of messages, e.g., posts, notifications, or the like that may be accessible via the mobile device 105, e.g., via an electronic application, website page, or the like. As offers or other information may be made available, e.g., via receipt of the first data at step 205, the marketing system 120 may add such offers or information to the stream. In some embodiments, the messages in the stream may be selectable via the mobile device 105. In some embodiments, selecting a particular message may cause the mobile device 105 to access the URL or other data associated with the offer that enables the mobile device 105 to, for example, execute the offer, provide the user with additional information associated with the offer, save the offer in a list or database associated with the user, compare the selected offer with other offers, or the like. In some embodiments, selecting the particular message may cause the mobile device 105 to access an e-commerce application and/or website page of the marketing system 120 that enables the mobile device 105 to execute the offer with the marketing system 120. In response to such offer being executed with the marketing system 120, the marketing system 120, in some embodiments, may then execute the associated offer with the vendor system 110. In addition to offers, information that the marketing system 120 may insert in the stream may include, for example, reminders associated with offers, incentives associated with offers, or other information, as discussed in further detail below.

In some embodiments, when generating the stream, the marketing system 120 may select one or more offers from the first data to be included in the stream. Such selection may be based on the first data and/or the second data (step 220). In addition to historical user information associated with at least one offer that was one or more of engaged with or redeemed by the user, the second data may include, for example, one or more of other historical information associated with the user, a list of contacts of the user, historical offer information, historical information associated with the stream, predictions and/or historical data for a number of users viewing, engaging, or executing offers with a variety of incentives, or other information usable as criteria for selecting an offer.

The list of contacts of the user may include, for example, a name, email, phone number, user identification, relationship to the user, or the like for one or more persons who is a contact of the user. The list of contacts may include data retrieved from a database accessible to the marketing system 120, a profile associated with the user, data retrieved via an automated process from the Internet, or other sources. In some embodiments, the list of contacts may include an indication of whether each person is a mutual contact whereby the user is a contact of the person and the person is a contact of the user. Any acceptable identifier of a contact of the user and any acceptable source for such information may be used. In some embodiments, the list of contacts may include data identifying one or more of incentives, offers, and/or vendors engaged with and/or executed by the one or more persons. Thus, in some embodiments, an offer may be selected from the first data to be inserted into the stream based on, for example, the offer, an incentive associated with the offer, and/or a vendor associated with the offer having been engaged with or executed by a contact or mutual contact of the user.

Historical user information may include, for example, one or more records of a previous engagement with or execution of an offer by the user, records of vendors that the user has previously engaged with and/or executed offers with, descriptive or profile information for the user such as subject matter or product interests, social information such as contacts or information provided by the user on social media, incentive information associated with the user such as accumulated membership points, or the like. In various embodiments, historical user information may be one or more of provided by the user via the mobile device 105 or another system, retrieved from a database of user information, or extracted from one or more systems, e.g., on the Internet. Thus, in some embodiments, an offer may be selected from the first data to be inserted into the stream based on, for example, the user having one or more of a previous engagement or execution of a similar offer or the vendor associated with the offer, a reward or membership benefit applicable to the offer, profile data associated with the product available in the offer, or other information associated with the offer.

Historical offer information may include, for example, a quantity of times an offer has been engaged with or executed, previous time windows for the offer, other offers for a same or similar product, or the like. Historical stream information may include data associate with offers previously included in the stream, information associated with engagement and/or execution of offers on the stream by the user, a rate at which offers have been added to the stream, a rate at which the user historically engages with or executes offers from the stream, or a current number of offers in the stream, or the like. Thus, in some embodiments, an offer may be selected from the first data to be inserted into the stream based on such historical offer information.

In some embodiments, the marketing system 120 may employ a first machine learning model configured to select one or more offers from the first data to be inserted into the stream. In various embodiments, the first machine learning model may be trained using at least a portion of the first data and/or second data discussed above, and may be tuned to optimize for selection of an offer that is one or more of likely to be engaged by the user, related to a product interest or profile information of the user, likely to be executed by the user, of high value to the user, of high value to the marketing system 120, of high value to the vendor system(s) 110 associated with the offers, have time windows that expire soon, or other criteria.

The execution of a machine learning model, as used in this disclosure, may include deployment of one or more machine learning techniques, such as linear regression, logistical regression, random forest, gradient boosted machine (GBM), and/or a deep neural network. Supervised or unsupervised training may be employed. For example, unsupervised approaches may include K-means clustering. K-Nearest Neighbors may also be used, which may be supervised or unsupervised. Combinations of K-Nearest Neighbors and an unsupervised cluster technique may also be used.

Any of N parameters associated with an offer, the stream, and/or the user may correspond to a dimension in such a model. As a machine learning system is trained, parameters that have been selecting offers in the past may form clusters in N-dimensional space. When the machine learning model ultimately selects one or more offers, data from the current identification may be fed to the machine learning system, for example, as an N-dimensional vector. Whatever clusters in the model are closest to the current terms in N-dimensional space, and the parameters for the offer associated therewith, may determine whether a particular offer is considered a match to the selection criteria. Simpler models may be deployed in parallel for speed. For example, rather than analyze all N parameters for a current product, offer, or incentive, a small number of predetermined parameters N-X may be fed to a simplified machine learning system to quickly determine if a particular offer is likely to be engaged with by the user.

In some embodiments, the marketing system 120 may insert offers into the stream chronologically in the order in which they are received via the first data. In some embodiments, the marketing system 120 may arrange at least one offer in the stream based on the first data and/or the second data. For example, the marketing system 120 may place an offer with a high likelihood of engagement by the user before another offer with a lower likelihood of engagement. In some embodiments, the marketing system 120 may arrange at least one offer in the stream in response to a request from the vendor system 110. Any acceptable arrangement or ordering may be used. In some embodiments, the stream is associated with an index or search utility accessible via the mobile device 105.

In some embodiments, the marketing system 120 may perform step 210 at regular intervals. In some embodiments, the marketing system 120 may perform step 210 continuously and/or in conjunction with other acts. For example, in some embodiments, steps 205 and 210 may each be performed continuously in conjunction with each other in order to form a live stream of offers. In some embodiments, the marketing system 120 may repeat step 210 in response to, for example, a request from the user via the mobile device 105, a request from an electronic application on the mobile device 105, an indication that one or more additional offers are available via the vendor system 110, etc.

With regard to step 215, in some embodiments, the marketing system 120 may select one or more offers from the stream for adding the respective incentive. In various embodiments, such selection may be based on similar factors for selecting offers to be included in the stream. In some embodiments, one or more thresholds for such parameters may be different for making a selection regarding an incentive relative to making a selection for including an offer in the stream. For example, the marketing system 120 may select an offer to include in the stream based on a likelihood that the user will engage with the offer being above or below a first predetermined, and then the marketing system 120 may select the offer for receiving an incentive based on the likelihood that the user will engage with the offer being above or below a second predetermined threshold different than the first. Adding an incentive to an offer may increase the likelihood that the user will engage with and/or execute the offer.

In some embodiments, the marketing system 120 may employ the first machine learning model to select offers to receive incentives. In some embodiments, the marketing system 120 may generate a respective incentive for each offer in the stream. In some embodiments, the marketing system 120 may add the respective incentive to each offer. In some embodiments, the marketing system 120 may select one or more of the generated incentives to be added to corresponding offers in the stream. For example, in some embodiments, the marketing system 120 may select one or more incentives based on a comparison of the generated incentives with each other. In some embodiments, the marketing system 120 may determine whether and how much the likelihood of the user engaging with and/or executing the corresponding offer changes with the addition of the incentive, and the selection of the one or more incentives to add to the corresponding offer(s) may be based on whether the change is above a predetermined threshold. In some embodiments, the selection may be based on, for example, the value added by the incentive to one or more of the user, the marketing system 120, or the vendor system 110.

In various embodiments, the respective incentive to be added to a corresponding offer may have a magnitude that is generally indicative of a value of the incentive to the user. Generally, the magnitude describing the respective incentive may correspond to the type of benefit available via the respective incentive. As noted above, the respective incentive may provide cash-back, a cash-back percentage, a price discount, a quantity of membership points, a bonus offer or product, or the like. Thus, the magnitude for the respective incentive may be, for example, a cash value, a percentage, a quantity value, or an equivalent cash value, or the like. Any acceptable measure for an incentive's value to the user may be used to define the magnitude. In various embodiments, the type of benefit provided by an incentive and/or the magnitude may be received via manual entry from a user, may be determined based on preference data or a request from the vendor system 110, and/or may be determined via a machine learning model or algorithm.

In some embodiments, the respective incentive may be dynamic in that, for example, the magnitude for the respective incentive may be varied. In some embodiments, the magnitude for the respective incentive may vary along a range from a minimum to a maximum. In various embodiments, the minimum may be received via manual entry from a user, determined via an algorithm or machine learning model, or determined based on the type of benefit awarded by the respective incentive. In some embodiments, the minimum is zero or an equivalent for the measure used for the respective incentive, e.g., $0, 0%, 0 points, etc. In some embodiments, the minimum may be set to a non-zero value.

In some embodiments, the maximum may be received via manual entry from a user, determined via an algorithm or machine learning model, or determined based on the type of benefit awarded by the respective incentive. For example, in some embodiments, the maximum for the respective incentive is selected based on the affiliate information for the corresponding offer from the first data. In some embodiments, a vendor may provide a 5% commission rate for executions of the corresponding offer via the marketing system 120. Thus, a difference between the commission rate and the monetary value of the benefit provided by the respective incentive may correspond to the value of the offer to the marketing system 120. In some embodiments, the marketing system 120 may deprioritize value to the marketing system 120 in favor of, for example, value to the user and/or to the vendor system 110. In an exemplary use case, the marketing system 120 may deprioritize value to the marketing system 120 when selecting the maximum in order to attract more users and negotiate a more favorable commission rate with the vendor system 110.

In some embodiments, the maximum may be determined based on a second machine learning model configured to optimize for one or more factors such as, for example, a net present value of the corresponding offer to a corresponding vendor, the value to the user, the value to the marketing system 120, or other factors. The second machine learning model may be trained, for example, using at least a portion the second data such as historical data related to engagement rates of users for offers with a variety of incentives. In some embodiments, the marketing system 120 may additionally adjust and/or determine the maximum based on the first machine learning model. For example, in some embodiments, the first machine learning model is used to train the second machine learning model. In some embodiments, the first machine learning model may be used to adjust the maximum determined by the second machine learning model. In some embodiments, the first and second machine learning models are each modules of a combined machine learning model.

In an exemplary embodiment, the marketing system 120 has selected an offer from the stream to receive a percentage cash-back incentive. When generating the incentive for the selected offer, the marketing system 120 employs the second machine learning model to determine the maximum for the respective incentive. In this embodiment, the second machine learning model is tuned to optimize for the value to the user and for the net present value of the offer to the vendor associated with the offer. The second machine learning model determines that a 1% maximum cash-back incentive is predicted to result in a 15% engagement rate from users viewing the incentivized offer, that a 2% maximum cash-back incentive is predicted to result in a 24% engagement rate from users viewing the incentivized offer, and 3% maximum cash-back incentive is predicted to result in a 25% engagement rate from users viewing the incentivized offer.

The net-present value of an offer may be determined, for example, based on the purchase price of the offer minus the value of any added incentive, multiplied by the total number of purchases. Thus, based on an estimated or predicted number of users viewing the offer, and the estimated engagement rates of users with various options for the incentivized offer, the second machine learning model may determine predicted or estimate net present values for the various options for the incentivized offer. In this exemplary embodiment, the 1% maximum cash-back incentive is predicted to result in a $5,000 net present value to the vendor, the 2% maximum cash-back incentive is predicted to result in a $10,000 net present value to the vendor, and the 3% maximum cash-back incentive is predicted to result in a −$5,000 net present value to the vendor. The 2% maximum cash back thus optimizes for the value of the user from amongst options that do not result in a negative net present value for the vendor. The second machine learning model may therefore select the 2% maximum cash-back incentive for the corresponding offer as providing the highest net present value to the vendor. Different selections may be made based on different predictions and/or different selection criteria without departing from the scope of this disclosure.

In various embodiments, the marketing system 120 may incrementally adjust the magnitude of the corresponding incentive at various times and for various reasons, as discussed in further detail below. In some embodiments, the corresponding offer may have a limited time window, and the marketing system 120 periodically increments the magnitude of the respective incentive away from the maximum and toward the minimum.

In some embodiments, the incentive is associated with social engagement of various users with the marketing system 120 in general and/or with the offer in particular. In some embodiments, the magnitude of the respective incentive may be initialized at the minimum, and may be incremented toward the maximum based on a quantity of users that have executed the corresponding offer, e.g., at step 230 in FIG. 2. For example, in some embodiments, in response to receiving an indication that another user has executed the corresponding offer, the marketing system 120 may increment the magnitude of the respective incentive toward the maximum. In some embodiments, the indication is that a contact or mutual contact of the user has executed the corresponding offer.

In some embodiments, in response to receiving an indication that another user has executed the corresponding offer, the marketing system 120 may, instead of or in addition to incrementing the magnitude, incrementally increase or decrease the limited time window for the offer and/or incentive. In various embodiments, an amount by which the magnitude or other aspect of the respective incentive may be predetermined or determined, e.g., via the second machine learning model, based on at least a portion of the first data and/or the second data.

In some embodiments, the selection of offers to include in the stream (step 210) and/or the selection of offers to receive an incentive (step 215), may be based on the maximum for the respective incentive and/or the current magnitude of the respective incentive. Thus, in some embodiments, the magnitude, maximum, and/or the respective incentive may be determined/generated prior to or in conjunction with the selection of offers to insert into the stream. In some embodiments, steps 210 and 215 may be performed concurrently, iteratively, and/or continuously.

In various embodiments, the marketing system 120 may include an indication of the respective incentive in the stream. For example, in some embodiments, the marketing system 120 may display information associated with the incentive in conjunction with the offer in the stream. Such information may include, for example, the vendor associated with the offer, the information associated with the offer, the type and/or magnitude of the incentive, the name or user identification of one or more users that have previously executed the offer and/or incentive, a remaining portion of the time-window of availability for the offer and/or the incentive, or the like. In some embodiments, the information may include a current magnitude of the incentive as well as the maximum for the magnitude.

In some embodiments, an incentive and/or offer in the stream may include a selectable button for sharing the offer and/or incentive with at least one contact of the user. In some embodiments, the marketing system 120 may increment the magnitude of the offer for only the user by an additional amount in response to the at least one contact redeeming the offer and/or registering a profile with the marketing system 120. In some embodiments, the marketing system 120 may issue a bonus reward (e.g., membership points, a coupon, a cash or equivalent reward, etc.) in response to the at least one contact redeeming the offer and/or registering a profile with the marketing system 120.

With regard to step 220, it should be understood that, in various embodiments, step 220 may be performed prior to, after, or in conjunction with other steps or acts. In some embodiments, second data may be received continuously, and/or in response to a request or other act or step. In some embodiments, the user has not previously engaged with or executed an offer, and the historical user information may include a null indication, or the like.

With regard to step 225, a notification separate from the stream generally encompasses any message, visual indication, icon, text, or the like that may be output by the mobile device 105. In some embodiments, a notification on the mobile device 105 may be output by an operating system of the mobile device 105 and/or in conjunction with an electronic application executed on the mobile device 105. In some embodiments, the notification may be selectable by the user, and causes the mobile device 105 and or and/or the electronic application to display one or more of the offer, information associated with the offer, a website page corresponding to the offer generated by the marketing system 120, a website page corresponding to the offer that is associated with the vendor system 110, a portion of the stream including the offer, or the like.

In various embodiments, the particular offer selected from the stream to be included in the notification transmitted to the mobile device 105 separate from the stream may be selected based on various criteria. In some embodiments, the particular offer may be selected based on one or more of the likelihood of engagement or execution by the user, the value to the user, the value to the vendor system 110, or the value to the marketing system 120 being above a predetermined threshold. In some embodiments, the selection may be based on historical information for the user. For example, the historical information may indicate that the user may be more likely to engage with a particular type of offer via a notification outside the stream than via the stream itself.

In some embodiments, the marketing system 120 may employ the first machine learning model to select the particular offer to be included in the notification. In various embodiments, the first machine learning model may be tuned to optimize the selection of the particular offer for one or more of the value of the particular offer to the user, or the likelihood of engagement by the user with the particular offer, etc. As noted above, the first machine learning model may be trained with the first data, the second data, and/or the respective incentives added to the offers included in the stream.

In some embodiments, the marketing system 120 may repeat the selection of the particular offer and the transmission of the notification. For example, in some embodiments, step 225 may be repeated at a predetermined regular interval, and/or in response to a criteria. The magnitude of incentives added to offers, and/or the offers available in the stream may change over time, and thus repetition of step 225 may result in selection of different particular offers to be included in the notification. In some embodiments, step 225 may be repeated in response to one or more parameters associated with the respective incentive and/or corresponding offer changing by at least a threshold amount. For example, the likelihood of engagement and/or execution by the user may change by a threshold amount, the time window of availability for the corresponding offer may be reduced below a threshold period of time, etc. Repetition of step 225 may account for adjustments to the magnitude of the respective incentives to corresponding offers, and to the particular offer more specifically, due to redemptions/executions of various offers by at least one additional user.

With regard to step 230, it should be understood that, in various embodiments, the indication that one or more users has executed or redeemed the corresponding offer included in the stream may be received prior to, in conjunction with, and or after another act or step. For example, the marketing system 120 may receive such an indication prior to the generation of the respective incentive and/or prior to inclusion of the corresponding offer in the stream, and thus the respective incentive may be added to the offer with an initial magnitude greater than the minimum. In some embodiments, the indication that one or more users has executed or redeemed the corresponding offer may be used as a criteria for selecting the offer for inclusion in the stream (step 210) and/or for receiving the respective incentive (step 215).

In some embodiments, the current magnitude of the respective incentive may be insufficient to induce the user to engage with and/or execute the corresponding offer. For example, in some embodiments, the current incentive may have a range for the magnitude for the respective incentive that includes a prime magnitude at which the customer may choose to engage and/or execute the offer, but the current magnitude may be less than that prime magnitude. As an exemplary use case, a user may be very likely (greater than 50%) to engage with an offer having a 5% cash-back incentive, but less likely (less than 30%) to engage with an offer having a 4% or lower cash-back incentive. An offer in the user's stream has an incentive with a magnitude that can range from 0% to 6%, but that is currently at 4%.

Thus, while the incentive has a potential to cause the user to engage and/or execute the offer, that potential may not be optimal when the magnitude of the incentive is below the prime 5% magnitude. In other exemplary use case, similar circumstances may occur for the value of the offer and incentive to the user, time window of availability remaining, or the like, whereby the current magnitude of the offer is not at the prime value available in the magnitude range for the incentive.

In some embodiments, the marketing system 120 may be configured to determine whether one or more of the value of an offer to the user or the likelihood of engagement of the user with the offer is below a predetermined threshold. In some embodiments, the predetermined threshold may correspond to the prime magnitude at which the magnitude may be optimized to cause the user to engage with the offer. In some embodiments, the predetermined threshold corresponds to a point at which further increase to the magnitude may have a diminishing return. In some embodiments, the predetermined threshold may be received via manual entry, e.g., from a user or the vendor system 110, etc.

In some embodiments, the determination of the predetermined threshold may be made with regard to one or more of the corresponding offer or the particular offer. In some embodiments, the predetermined threshold may be based on one or more of the first data or the second data. In some embodiments, the marketing system 120 may be configured to determine the threshold based on a comparison between various increases in the magnitude of the respective incentive corresponds and resulting increases in the value of the offer to the user and/or the likelihood of engagement by the user.

For example, the marketing system 120 may determine, e.g., based on the first data and or second data, that a magnitude between 0% and 3% has little impact on the user's likelihood of engaging with an offer, but that the likelihood begins to steadily rise for magnitudes above 3%. The marking system 120 may determine that the increase to the likelihood of engagement experiences diminishing returns for increases to the magnitude above 4%. Thus, in various embodiments, the predetermined threshold may be determined as one or more of an inflection point, point of diminishing return, asymptote, average, median, or the like for a relationship between the magnitude of an incentive and one or more of the value of the offer to the user or the likelihood of engagement of the user for the offer.

In some embodiments, e.g., when the value and/or likelihood is below the predetermined threshold discussed above, the marketing system 120 may be configured to employ a process to raise the value and/or likelihood to at least the predetermined threshold. For example, in some embodiments, the marketing system 120 may adjust one or more of the magnitude of the incentive, the increment used to adjust the magnitude, the time-window of availability for the offer or the incentive, or the like. In some embodiments, the marketing system 120 may generate one or more indications of a redemption of the offer by one or more fictitious users. Such a redemption may be treated in the same manner as redemptions from non-fictitious users, e.g., causes the magnitude of the offer to be incremented. The marketing system 120 may generate a quantity of such fictitious redemptions sufficient to one or more of increase a number of other users that engage with and/or execute the offer, to cause the magnitude of the offer to be incremented by an amount sufficient to raise the one or more of the value or likelihood of engagement for the user for the offer above the predetermined threshold.

Thus, such fictitious users may be used to bump the magnitude of an offer into a more optimal range for the user. Such fictitious users may also be used to initiate social engagement effects for the offer. As discussed above, a user may be more likely to engage with or execute an offer given the understanding that doing so not only benefits the user, but also other persons. For example, a notification that the offer has already been executed by a fictitious user may reduce the barrier to entry for the user.

With regard to step 235, in various embodiments, the marketing system 120 may transmit the reminder for the corresponding offer at various instances and/or in response to various criteria. In some embodiments, the reminder is transmitted a predetermined period of time prior to expiration of the time-window of availability of the corresponding offer or the respective incentive. In some embodiments, the reminder may be transmitted in response to the magnitude of the respective incentive rising above a predetermined amount, e.g., to at least the predetermined threshold or the prime magnitude. In some embodiments, the reminder may be transmitted in response to the contact or mutual contact of the user engaging with or executing the offer. In some embodiments, the user may initiate a request, e.g., via the mobile device 105, for the reminder.

With regard to step 240, in some embodiments, the marketing system 120 may perform the method discussed above for multiple mobile devices 105 associated with multiple users. Thus, when a first user engages with or executes an offer, the marketing system 120 may transmit an indication of such act to a second user and/or adjust the stream of the second user in the manner discussed above. In this manner, multiple users are able to interact through the engagement and execution of offers.

Figure 3:
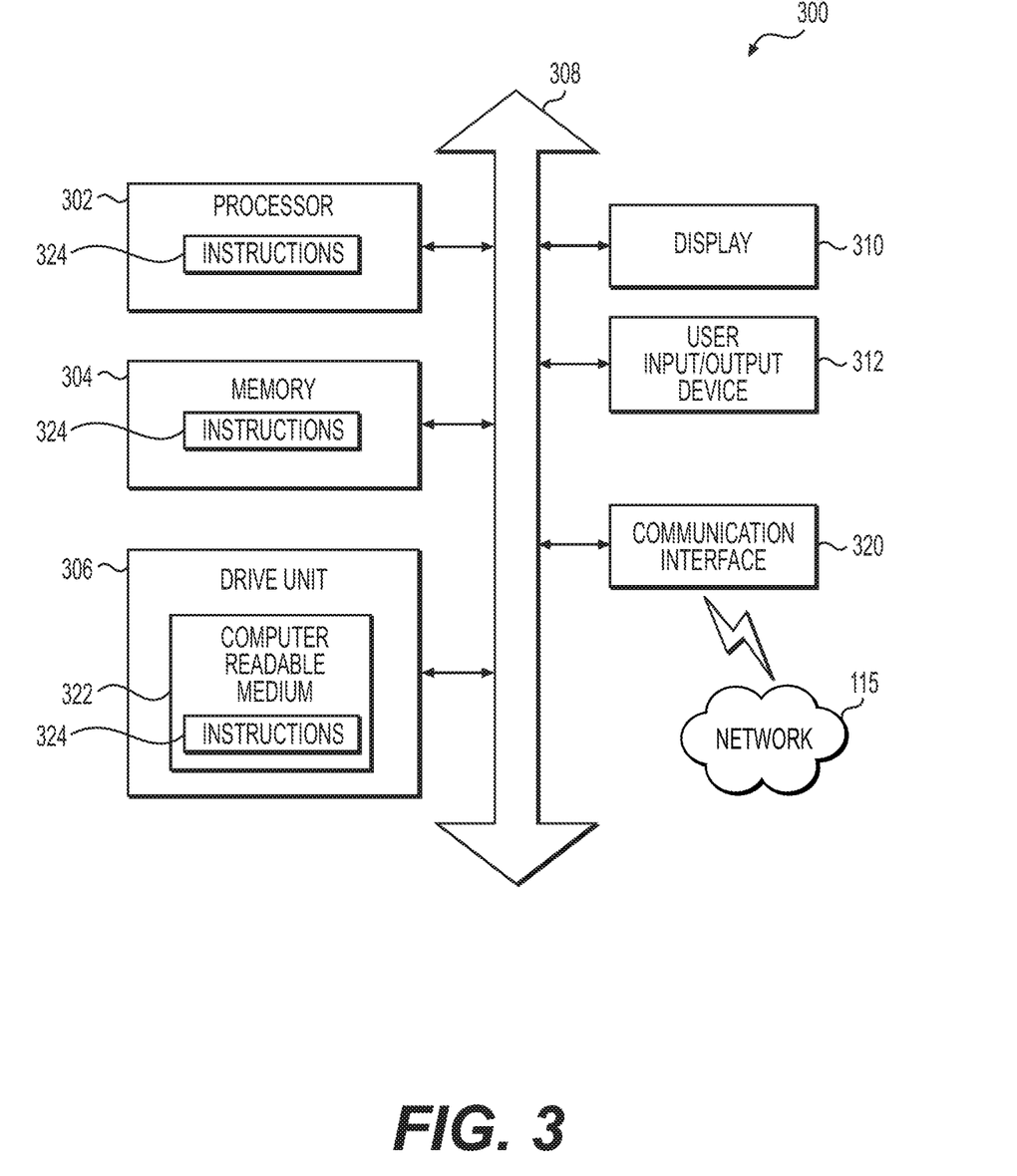
FIG. 3 depicts an example of a computing device, according to aspects of the present disclosure.

FIG. 3 is a simplified functional block diagram of a computer 300 that may be configured as a device for executing the method of FIG. 2, according to exemplary embodiments of the present disclosure. FIG. 3 is a simplified functional block diagram of a computer that may be configured as the marketing system 120 according to exemplary embodiments of the present disclosure. Specifically, in one embodiment, any of the mobile devices, systems, servers, etc., discussed herein may be an assembly of hardware 300 including, for example, a data communication interface 320 for packet data communication. The system 300 also may include a central processing unit ("CPU") 302, in the form of one or more processors, for executing program instructions. The system 300 may include an internal communication bus 308, and a storage unit 306 (such as ROM, HDD, SDD, etc.) that may store data on a computer readable medium 322, although the system 300 may receive programming and data via network communications. The system 300 may also have a memory 304 (such as RAM) storing instructions 324 for executing techniques presented herein, although the instructions 324 may be stored temporarily or permanently within other modules of system 300 (e.g., processor 302 and/or computer readable medium 322). The system 300 also may include input and output ports 312 and/or a display 310 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes shown in FIG. 2, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method of generating a marketing offer for a user associated with a mobile device, the method comprising:
   receiving a stream of first data that includes data regarding one or more offers for sale of a product;
   causing a mobile device to continuously output a visual indication of the one or more offers, such that the output displayed by the mobile device is continuously updated as additional data is received via the stream of first data;
   generating a maximum for a magnitude of a respective incentive for a corresponding offer in the output displayed by the mobile device, wherein generating the maximum for the magnitude includes using a first machine learning model configured to optimize a net present value of offers to corresponding vendors of the offers, the first machine learning model being trained using historical data of engagement rates of users for offers with a variety of incentives;
   modifying the output displayed by the mobile device such that the respective incentive is added to the corresponding offer in the output displayed by the mobile device;
   continuously monitoring a memory that tracks redemption of the respective incentive by one or more users other than a user associated with the mobile device;
   in response to determining, based on the monitoring, that a user has redeemed the respective incentive, determining an increase in the magnitude of the respective incentive toward the maximum based on a number of users indicated in the memory as having redeemed the respective incentive; and
   further modifying the output displayed by the mobile device such that the respective incentive added to the corresponding offer is continuously adjusted by the determined increase as additional users redeem the resective incentive.

2. The computer-implemented method of claim 1, further comprising:
   determining that the one or more of a value of the corresponding offer to the user, or a likelihood of engagement of the user with the corresponding offer is below a predetermined threshold; and
   generating one or more indications of a redemption of the corresponding offer by one or more fictitious users that causes the magnitude of the respective incentive added to the corresponding offer to be incremented by an amount sufficient to raise the one or more of the value of the corresponding offer to the user, or the likelihood of engagement of the user with the corresponding offer above the predetermined threshold.

3. The computer-implemented method of claim 1, further comprising:
   obtaining historical user information that includes information associated with at least one offer that was one or more of engaged with or redeemed by the user;
   determining, based on the historical user information, that an offer is offered by a vendor with which the user has previously engaged, or redeemed a previous offer with, or both; and
   selecting the offer as the corresponding offer based on the determining.

4. The computer-implemented method of claim 1, further comprising:
   adjusting the corresponding maximum for the respective incentive using a second machine learning model that has been trained based on second data that includes historical user information associated with the user, to determine a value for the corresponding maximum for the respective incentive configured to result in a likelihood of engagement of the user with the corresponding offer above a predetermined threshold.

5. The computer-implemented method of claim 1, wherein the respective incentive includes one or more of a discount, a point reward, a cash-back percentage, a fixed-amount cash back, a coupon, a bonus product, or a bonus offer.

6. The computer-implemented method of claim 1, wherein the respective incentive includes a time limit for redemption of the corresponding offer with the respective incentive.

7. The computer-implemented method of claim 6, further comprising:
at a predetermined time prior to expiration of the time limit, transmitting a reminder for the corresponding offer to the mobile device.

8. The computer-implemented method of claim 1, wherein selection of the corresponding offer is repeated after a predetermined interval.

9. The computer-implemented method of claim 1, further comprising:
in response to receiving an indication from the mobile device that the user has redeemed the corresponding offer, transmitting an indication of the redemption of the corresponding offer to at least one system associated with at least one additional user.

10. A computer-implemented method of generating a marketing offer for a user associated with a mobile device, the method comprising:
receiving a stream of first data that includes data regarding one or more offers for sale of a product;
causing a mobile device to continuously output a visual indication of the one or more offers, such that the output displayed by the mobile device is continuously updated as additional data is received via the stream of first data;
generating a maximum for a magnitude of a respective incentive for a corresponding offer in the output displayed by the mobile device, wherein generating the maximum for the magnitude includes using a first machine learning model configured to optimize a net present value of offers to corresponding vendors of the offers, the first machine learning model being trained using historical data of engagement rates of users for offers with a variety of incentives, wherein: the respective incentive includes one or more of a discount, a point reward, a cash-back percentage, a fixed-amount cash back, a coupon, a bonus product, or a bonus offer;
modifying the output displayed by the mobile device such that the respective incentive is added to the corresponding offer in the output displayed by the mobile device;
accessing a profile of the user on a social media platform and extracting, from the profile, a list of contacts of the user;
determining, based on the list of contacts, that the user is a mutual contact on the network social media platform of one or more users;
continuously monitoring a memory that tracks redemption of the respective incentive in the output displayed by the mobile device;
in response to determining, based on the monitoring, that a number of the one or more users that are a mutual contact of the user have redeemed the respective incentive, determining an increase in the magnitude of the respective incentive toward the maximum based on the determined number of the one or more users indicated in the memory as having redeemed the respective incentive; and
further modifying the output displayed by the mobile device such that the respective incentive added to the corresponding offer is continuously adjusted by the determined increase as additional users redeem the respective incentive.

11. The computer-implemented method of claim 10, further comprising:
determining that the one or more of a value of the corresponding offer to the user, or a likelihood of engagement of the user with the corresponding offer is below a predetermined threshold; and
generating one or more indications of a redemption of the corresponding offer by one or more fictitious users that causes the magnitude of the respective incentive added to the corresponding offer to be incremented by an amount sufficient to raise the one or more of the the value of the corresponding offer to the user, or the likelihood of engagement of the user with the corresponding offer above the predetermined threshold.

12. The computer-implemented method of claim 10, further comprising:
obtaining historical user information that includes information associated with at least one offer that was one or more of engaged with or redeemed by the user;
determining, based on the historical user information, that an offer is offered by a vendor with which the user has previously engaged, or redeemed a previous offer with, or both; and
selecting the offer as the corresponding offer based on the determining.

13. The computer-implemented method of claim 10, further comprising:
adjusting the corresponding maximum for the respective incentive using a second machine learning model that has been trained based on second data that includes historical user information associated with the user, to determine a value for the corresponding maximum for the respective incentive configured to result in a likelihood of engagement of the user with the corresponding offer above a predetermined threshold.

14. The computer-implemented method of claim 10, wherein:
the respective incentive includes a time limit for redemption of the offer with the respective incentive.

15. The computer-implemented method of claim 14, further comprising:
at a predetermined time prior to expiration of the time limit, transmitting a reminder for the offer to the mobile device.

16. The computer-implemented method of claim 10, wherein selection of the corresponding offer is repeated after a predetermined interval.

17. The computer-implemented method of claim 10, further comprising:
in response to receiving an indication from the mobile device that the user has redeemed an offer, transmitting an identification of the redemption of the offer to at least one additional user.

18. A computer-implemented method of generating a marketing offer for a user associated with a mobile device, the method comprising:
receiving a stream of first data that includes data regarding one or more offers for sale of a product;

causing a mobile device to continuously output a visual indication of the one or more offers, such that the output displayed by the mobile device is continuously updated as additional data is received via the stream of first data;

generating a maximum for a magnitude of a respective incentive for a corresponding offer in the output displayed by the mobile device, wherein generating the maximum for the magnitude includes using a first machine learning model configured to optimize a net present value of offers to corresponding vendors of the offers, the first machine learning model being trained using historical data of engagement rates of users for offers with a variety of incentives;

modifying the output displayed by the mobile device such that the respective incentive is added to the corresponding offer in the output displayed by the mobile device;

continuously monitoring a memory that tracks redemption of the respective incentive by one or more users other than a user associated with the mobile device;

in response to determining, based on the monitoring, that a user has redeemed the respective incentive, determining an increase in the magnitude of the respective incentive toward the maximum based on a number of users indicated in the memory as having redeemed the respective incentive;

further modifying the output displayed by the mobile device such that the respective incentive added to the corresponding offer is continuously adjusted by the determined increase as additional users redeem the respective incentive;

selecting a particular offer from the further modified output displayed by the mobile device to be separately provided to the user, by:

receiving second data that includes historical user information associated with the user;

using a second machine learning model, selecting a particular offer from the further modified output displayed by the mobile device, the second machine learning model configured to optimize the selection of the particular offer for one or more of a maximum value of the particular offer to the user or a likelihood of engagement of the user with the particular offer, and the second machine learning model being trained using the second data, the first data, and one or more incentives added to offers in the first data; and causing the mobile device to output a notification, separate from the output, that includes the particular offer, wherein the selection of the particular offer is repeated after a predetermined interval to account for adjustments to the incentive added to the particular offer due to redemptions to the particular offer by at least one additional user; and in response to receiving indication from the mobile device that the user has redeemed an offer from the further modified output displayed by the mobile device, transmitting an identification of the redemption of the offer to at least one additional user.

* * * * *